United States Patent
Menosky et al.

(10) Patent No.: US 6,837,795 B2
(45) Date of Patent: Jan. 4, 2005

(54) UNIVERSAL JOINT WITH BEARING CUP RETENTION SEAL ASSEMBLY

(75) Inventors: Marc M. Menosky, Burt, MI (US); Salvatore N. Grupido, Rochester, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 10/413,262

(22) Filed: Apr. 14, 2003

(65) Prior Publication Data

US 2004/0204252 A1 Oct. 14, 2004

(51) Int. Cl.$^7$ .................................................. F16D 3/41
(52) U.S. Cl. ...................................... 464/131; 464/133
(58) Field of Search .......................... 464/14, 131, 133

(56) References Cited

U.S. PATENT DOCUMENTS

| | | | |
|---|---|---|---|
| 3,200,615 A | | 8/1965 | Stokely |
| 3,266,269 A | * | 8/1966 | Stokely ................ 464/131 |
| 3,377,820 A | | 4/1968 | Smith |
| 3,479,840 A | | 11/1969 | Meyers |
| 3,595,586 A | | 7/1971 | Anderson |
| 3,788,100 A | | 1/1974 | Pitner |
| 3,858,413 A | | 1/1975 | Nemtsov et al. |
| 3,906,746 A | | 9/1975 | Haines |
| 4,021,085 A | | 5/1977 | Willyard |
| 4,312,547 A | | 1/1982 | Negele et al. |
| 4,440,401 A | | 4/1984 | Olschewski et al. |
| 4,515,574 A | | 5/1985 | Mazziotti |
| 4,530,675 A | | 7/1985 | Mazziotti |
| 4,576,382 A | | 3/1986 | Scharting et al. |
| 4,645,474 A | | 2/1987 | Olschewski et al. |
| 4,810,233 A | | 3/1989 | Crane, Jr. et al. |
| 4,834,691 A | | 5/1989 | Schultze et al. |
| 4,861,315 A | | 8/1989 | Mazziotti |
| 5,026,324 A | | 6/1991 | Schurger et al. |
| 5,342,240 A | | 8/1994 | Mazziotti |
| 5,597,356 A | | 1/1997 | Rieder |
| 5,613,691 A | | 3/1997 | Komai et al. |
| 5,626,520 A | | 5/1997 | Mazziotti |
| 5,716,277 A | | 2/1998 | Reynolds |
| 5,769,723 A | | 6/1998 | Faulbecker et al. |
| 6,050,899 A | | 4/2000 | Jones et al. |
| 6,059,663 A | | 5/2000 | Jones et al. |
| 6,077,166 A | | 6/2000 | Reynolds |
| 6,162,126 A | | 12/2000 | Barrett et al. |
| 6,183,369 B1 | | 2/2001 | Faulbecker et al. |
| 6,280,335 B1 | | 8/2001 | Wehner et al. |
| 6,357,757 B1 | | 3/2002 | Hibbler et al. |
| 6,406,373 B1 | | 6/2002 | Gibson |
| 6,601,855 B1 | * | 8/2003 | Clark ................ 464/133 X |

FOREIGN PATENT DOCUMENTS

| | | | | |
|---|---|---|---|---|
| GB | 1216973 | * | 12/1970 | ............. 464/14 |
| GB | 2257773 | * | 1/1993 | ............ 464/133 |

* cited by examiner

*Primary Examiner*—Greg Binda
(74) *Attorney, Agent, or Firm*—Harness, Dickey & Pierce P.L.C.

(57) ABSTRACT

A universal joint includes a pair of bifurcated yokes interconnected by a cruciform. The cruciform includes four orthogonal trunnions each including a radially extending protrusion. A seal engages the protrusion to retain a bearing assembly on each trunnion.

18 Claims, 3 Drawing Sheets

UNIVERSAL JOINT WITH BEARING CUP RETENTION SEAL ASSEMBLY

BACKGROUND OF THE INVENTION

The present invention generally relates to a universal joint for use in a driveline of a motor vehicle. More specifically, the present invention pertains to a universal joint equipped with a mechanism for securing a bearing cup assembly to a cruciform trunnion.

As is commonly known, universal joints are used in motor vehicle driveline applications for interconnecting a pair of rotary shafts and permitting changes in angularity therebetween. Many conventional universal joints include a pair of bifurcated yokes which are secured to the rotary shafts. The bifurcated yokes are interconnected by a spider or a cruciform for rotation about independent axes. The cruciform includes four orthogonal trunnions with each opposing pair of axially aligned trunnions mounted in a pair of aligned bores formed in the bifurcated yokes. Typically, a bearing cup is secured in each bore and a bearing assembly is retained in the bearing cup such that each yoke is supported for pivotal movement relative to one of the pairs of trunnions. In addition, it is known to use a thrust washer between the trunnion and the bearing cup to absorb the radially-directed thrust forces which may occur therebetween.

During assembly of the universal joint, difficulties may arise when attempting to couple the bearing assemblies to the bifurcated yokes. Typically, each bearing assembly, thrust washer and bearing cup are positioned on a trunnion but not positively retained thereto. During the assembly process, the bearing cup and bearing assembly may be accidentally disrupted and separated from the trunnion. Gravitational forces may also cause separation of the components during the assembly process. Possible bearing contamination and loss of productivity may result. In some instances, extraneous straps, nets or other packaging are used to retain the bearing cup assemblies in place during shipping and handling. These straps must be removed and discarded by the end user requiring expense of time and cost. Accordingly, it would be advantageous to provide a universal joint having bearing cup assemblies which are retained on the trunnions without the use of external discardable devices.

SUMMARY OF THE INVENTION

The present invention is directed to a universal joint for interconnecting a pair of rotating shafts. The universal joint includes a pair of bifurcated yokes interconnected by a cruciform. The cruciform includes four orthogonal trunnions. Each trunnion includes a radially extending protrusion. A seal engages the protrusion to retain a bearing assembly on each trunnion.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

In general, the present invention is directed to a universal joint of the type used in motor vehicle driveline applications for interconnecting rotating shafts in a manner permitting changes in angularity therebetween.

Figure 1:
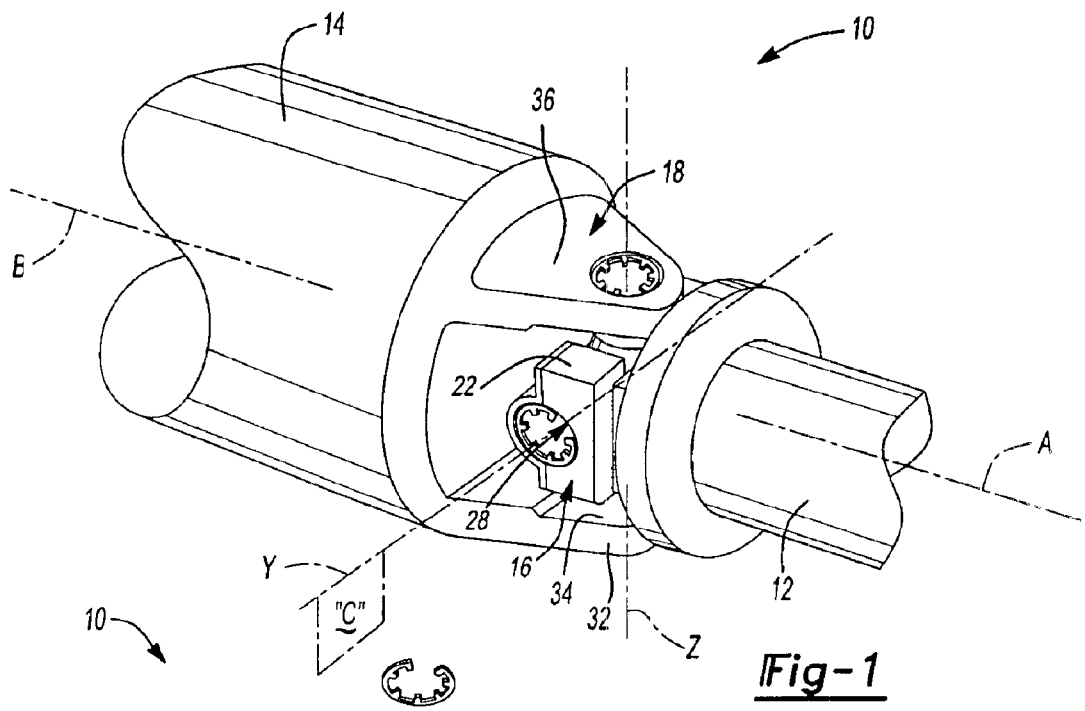
FIG. 1 is a perspective view of a universal joint according to the principals of the present invention.
Figure 2:
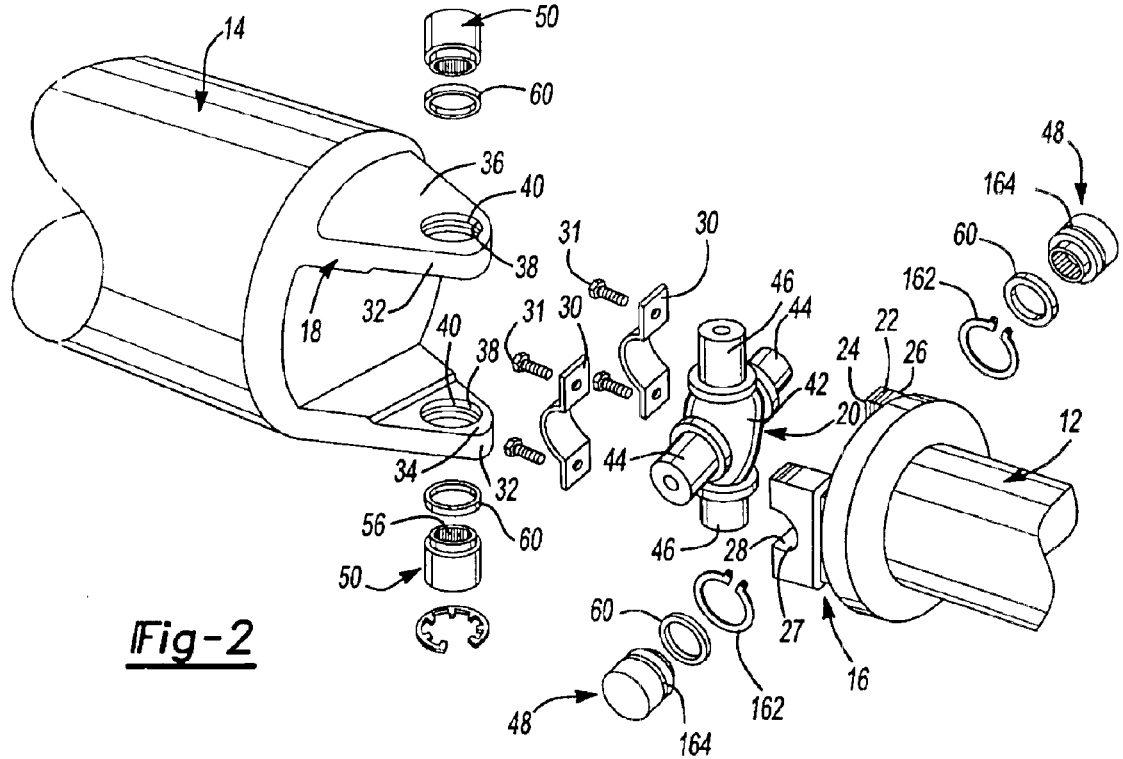
FIG. 2 is an exploded perspective view of the universal joint shown in FIG. 1.

Referring to FIGS. 1 and 2, a universal joint 10 is shown connecting a first shaft 12 to a second shaft 14. In general, universal joint 10 includes a first yoke 16 attached to an end of first shaft 12, a second yoke 18 attached to an end of second shaft 14 and a cruciform 20 interconnecting first yoke 16 to second yoke 18. The first yoke 16 is bifurcated and includes a pair of laterally-spaced legs 22 which are preferably symmetrical with respect to the rotary axis of first shaft 12, as denoted by construction line "A". Legs 22 include an inboard surface 24 and an outboard surface 26 with a journal 27 extending therebetween. Apertures 28 are formed by coupling a pair of end caps 30 to legs 22 via fasteners 31. End caps 30 cooperate with journals 27 to complete apertures 28. Apertures 28 are aligned on a first trunnion axis, as denoted by construction line "Y", which passes through and is orthogonal with respect to rotary axis "A" of first shaft 12.

Second yoke 18 is bifurcated and includes a pair of laterally-spaced legs 32 which are preferably symmetrical with respect to the rotary axis of second shaft 14, as denoted by construction line "B". Legs 32 include an inboard surface 34 and an outboard surface 36 with an aperture 38 extending therebetween. Apertures 38 are aligned on a second trunnion axis, as denoted by construction line "Z", which passes through and is orthogonal with respect to rotary axis "B" of second shaft 14. Apertures 38 are throughbores which include an annular groove 40 formed between the inboard surface 34 and the outboard surface 36. It should be noted that the shape and dimensions of apertures 28 and 38 may either be identical or different depending on the particular dimensions of cruciform 20 used therewith. It should also be noted that the annular ring groove 40 may be formed by machining, casting or by similar technique.

As best seen in FIG. 2, cruciform 20 includes a central hub 42 from which a pair of first trunnions 44 and a pair of second trunnions 46 extend. First trunnions 44 are orthogonal with respect to second trunnions 46. First trunnions 44 are adapted for insertion into apertures 28 in legs 22 of first yoke 16 so as to be axially aligned on first trunnion axis "Y". Similarly, second trunnions 46 are adapted to be inserted into apertures 38 in legs 32 of second yoke 18 so as to be axially aligned on second trunnion axis "Z". With first trunnions 44 and second trunnions 46 installed in first and second yokes 16 and 18, respectfully, trunnion axes "Y" and "Z" pass through a common plane "C" which orthogonally intersects the rotary axis of cruciform 20, as shown in FIG. 1.

Universal joint 10 also includes a first pair of bearing cup assemblies 48 adapted to be mounted in apertures 28 and a second pair of bearing cup assemblies 50 adapted to be mounted in apertures 38. First bearing cup assemblies 48 are provided for receiving and rotatably supporting first trunnions 44 in apertures 28. Similarly, second bearing cup assemblies 50 are provided for receiving and rotatably supporting second trunnions 46 in apertures 38. For purposes of brevity, the following description will be limited to the components of first bearing cup assemblies 48 with the understanding that the corresponding components of second bearing cup assemblies 50 are substantially identical.

Figure 3:
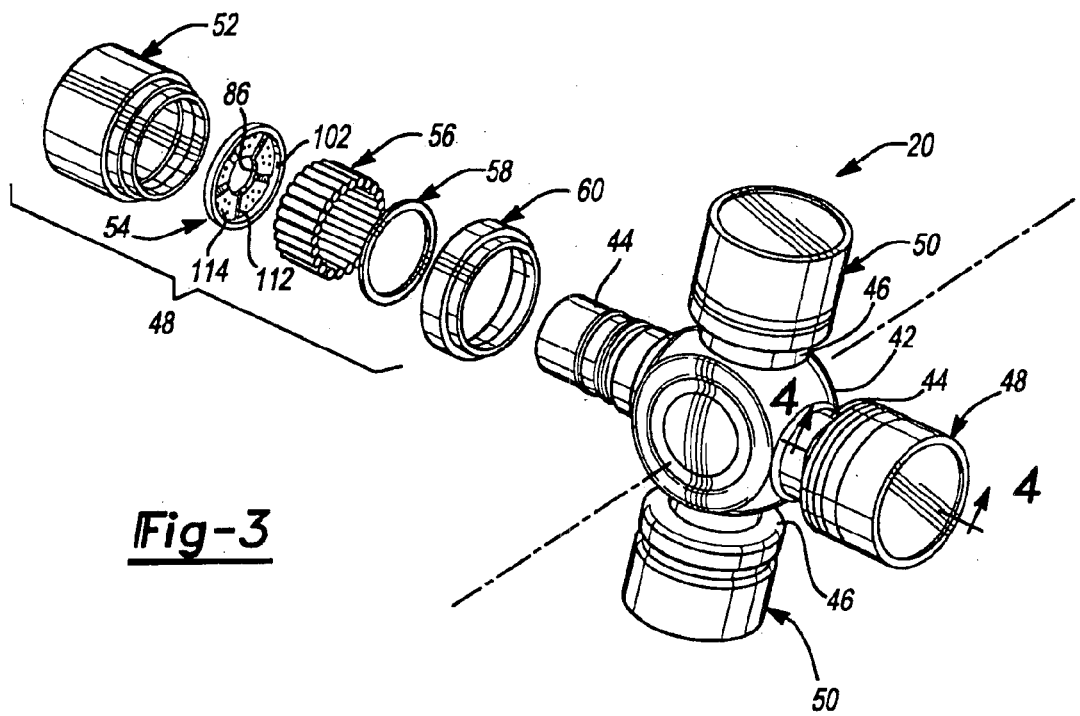
FIG. 3 is a partial exploded perspective view of a trunnion and bearing cup assembly of the present invention.
Figure 4:
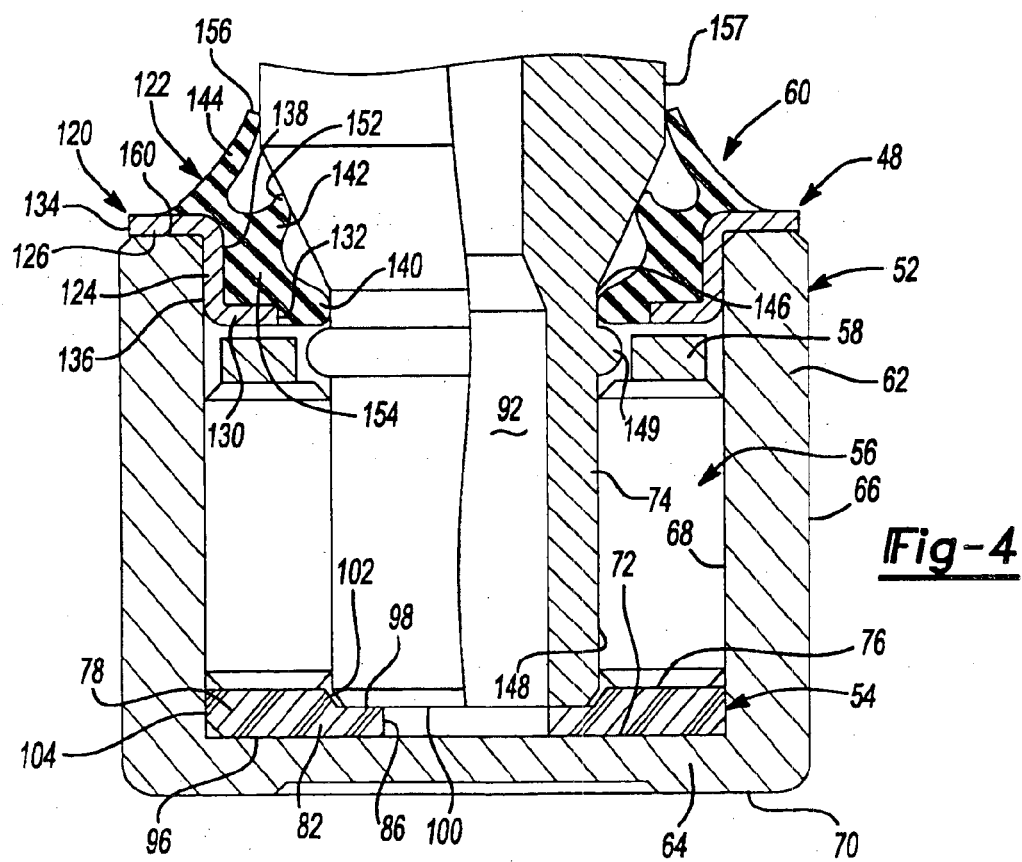
FIG. 4 is a partial cross-sectional side view of a universal joint including a trunnion and seal constructed in accordance with the teachings of the present invention.

FIGS. 3 and 4 depict each bearing cup assembly 48 as including a bearing cup 52, a thrust washer 54, roller bearings 56, a seal washer 58 and an elastomeric seal 60. Bearing cup 52 is substantially hollow and cylindrical in shape. Bearing cup 52 includes a substantially cylindrical tubular segment 62 closed at one end by an end segment 64. Tubular segment 62 includes an outer wall surface 66 and an inner wall surface 68. End segment 64 includes an outer surface 70 and an inner surface 72. Roller bearings 56 are positioned between inner wall surface 68 and an outer wall surface 74 of trunnion 44 to allow relative rotary movement between bearing cup 52 and trunnion 44. Roller bearings 56 are oriented to rotate on an axis parallel to axis "Y" of trunnions 44 and are arranged in a circumferential array about this axis. One end of each roller bearing 56 is supported to roll against the bearing surface 76 formed on a circumferential flange segment 78 of thrust washer 54. The opposite ends of roller bearings 56 are captured by seal washer 58 which, in turn, is retained by seal 60. Seal 60 extends between outer wall surface 66 of bearing cup 52 and outer wall surface 74 of trunnion 44 to protect roller bearings 56 from contamination and to retain lubricant within bearing cup assembly 48.

As best shown in FIGS. 3 and 4, thrust washer 54 includes a disk segment 82 from which circumferential flange 78 extends. A central aperture 86 extends through disk segment 82 and is in communication with a lubricant passage 92 found in each trunnion. A fitting (not shown) mounted on central hub 42 of cruciform 20 communicates with lubricant passage 92. The fitting is used to supply lubricant to passage 92 for lubricating roller bearings 56 as well as for providing a lubricant film between relatively moveable surfaces.

Disk segment 82 has an outer face surface 96 which faces and contacts inner surface 72 of bearing cup 52. Disk segment 82 also includes an inner face surface 98 which faces and contacts an end surface 100 of trunnion 44. Inner face surface 98 and outer face surface 96 are substantially parallel such that disk segment 82 has a constant thickness. In addition, thrust washer 54 includes a circumferential inner wall surface 102 and a circumferential outer wall surface 104, as defined by flange segment 78. Circumferential inner wall surface 102 is adapted to face outer wall surface 74 of trunnion 44. Circumferential outer wall surface 104 faces inner wall surface 68 of bearing cup 52. As such, thrust washer 54 functions to align bearing cup 52 and trunnion 44.

Thrust washer 54 includes a series of lubrication grooves 112 which extend radially from central aperture 86 to circumferential inner wall surface 102 of flange segment 78. Grooves 112 are arcuate in profile to define a cylindrical wall surface. It is preferable that an odd number of grooves 112 are provided and which are equally spaced to define a like number of pie-shaped portions of disk segment 82. In addition, a plurality of indentations or dimples 114 are formed on the pie-shaped portions of disk segment 82. Dimples 114 can be randomly oriented or, more preferably, be aligned to define two circumferential rows. Dimples 114 are adapted to retain lubricant therein to provide continuous lubrication over a large area of trunnion end surface 100. In addition, dimples 114 allow contaminants to be removed from the operating surfaces and be collected therein. Thrust washer 54 is constructed from a resilient material such as injection molded plastic.

FIG. 4 depicts seal 60 including a case 120 and an elastomer 122 bonded to case 120. Case 120 is preferably constructed from a mild steel. Elastomer 122 is preferably constructed from an injection moldable compound which is resilient and resistant to degradation from exposure to oil, grease, ozone or other commonly present compounds. Case 120 is a generally cup-shaped member formed from a steel sheet having a substantially constant thickness. Case 120 includes a wall 124, an outwardly extending flange 126, and an inwardly extending flange 130. Inwardly extending flange 130 terminates at a first edge 132. Outwardly extending flange 126 terminates at a second edge 134. Case 120 includes an inner surface 136 extending from first edge 132 to second edge 134. An outer surface 138 is positioned on the opposite side of case 120 from inner surface 136 and also extends from first edge 132 to second edge 134. Elastomer 122 is bonded to outer surface 138 and extends substantially from first edge 132 to second edge 134.

Elastomer 122 includes a first lip 140, a second lip 142 and a third lip 144. First lip 140 functions as a primary seal and engages trunnion 44 at a seal race portion 146. FIG. 4 depicts seal race portion 146 having a similarly sized outer diameter as compared to a bearing support portion 148. One skilled in the art will appreciate that seal race portion 146 may be sized and shaped differently from bearing support portion 148 without departing from the scope of the present invention. First lip 140 is sized to nominally interfere with seal race portion 146. Because elastomer 122 is constructed from a resilient material, first lip 140 biasedly engages seal race portion 146.

Trunnion 44 includes a projection 149 extending radially outwardly from bearing support portion 148. Projection 149 is sized and shaped to allow seal 60 to be installed over projection 149 without damaging the seal lips. However, projection 149 extends outwardly a distance sufficient to provide significant resistance to removal of the seal 60. In this embodiment, projection 149 is shaped as an annular ring outwardly extending to nominally interfere with first lip 140. Second lip 142 is shaped as a wiper 152 extending from a body 154 of elastomer 122. Wiper 152 extends from body 154 at an angle to resist ingress of contaminants.

Third lip 144 includes a wiper 156 radially inwardly extending from body 154. Wiper 152 and wiper 156 are constructed to biasedly engage an outer seal race portion 157 once positioned on trunnion 44. Wiper 156 deflects from an unloaded position (not shown) to the biasedly engaged position shown in FIG. 4. Wiper 156 is cantilevered from body 154 such that ingress of contaminants is resisted. It should be appreciated that lips 140, 142 and 144 are merely exemplary and that they may be constructed to include any number of cross-sectional shapes without departing from the scope of the present invention.

FIG. 4 depicts case 120 engaging bearing cup 52 in a press-fit arrangement. Specifically, wall 124 of case 120 engages inner wall surface 68 of bearing cup 52. Outwardly extending flange 126 is seated against an end surface 160.

Each of first lip 140, second 142 and third lip 144 are positioned inboard of projection 149. Accordingly, to remove seal 60 from trunnion 44, each of the seal lips must pass projection 149. Projection 149 provides resistance to this removal force by interfering with at least first lip 140. Furthermore, seal washer 58 is positioned adjacent projection 149. Seal washer 58 limits the axial displacement of roller bearings 56 and assures that the roller bearings do not interfere with projection 149.

Figure 5:
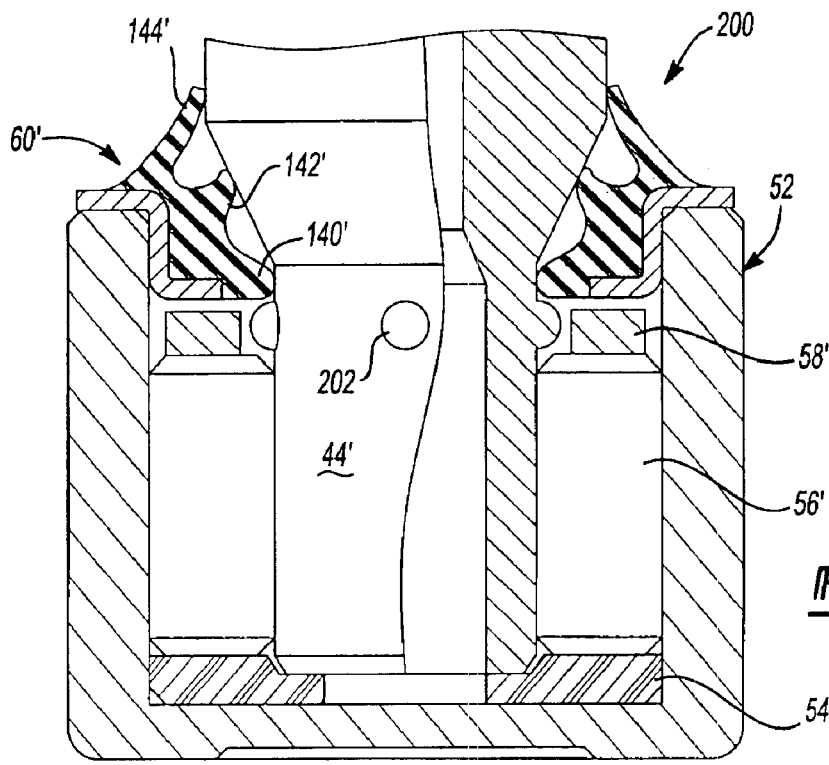
FIG. 5 is a cross-sectional side view of an alternate embodiment trunnion constructed in accordance with the teachings of the present invention.

FIG. 5 depicts an alternate embodiment retention mechanism 200. Retention mechanism 200 is substantially similar to the mechanism described with relation to FIG. 4. Accordingly, only the substantial differences will be described in detail hereinafter. Retention mechanism 200 includes a plurality of spaced apart nubs 202 radially extending from trunnion 44'. Nubs 202 may be more cost efficient to form than an annular ring, but function to retain seal 60' as previously mentioned. Protrusion mechanism 200 includes seal 60' and is otherwise substantially similar to the universal joint of FIG. 4.

Figure 6:
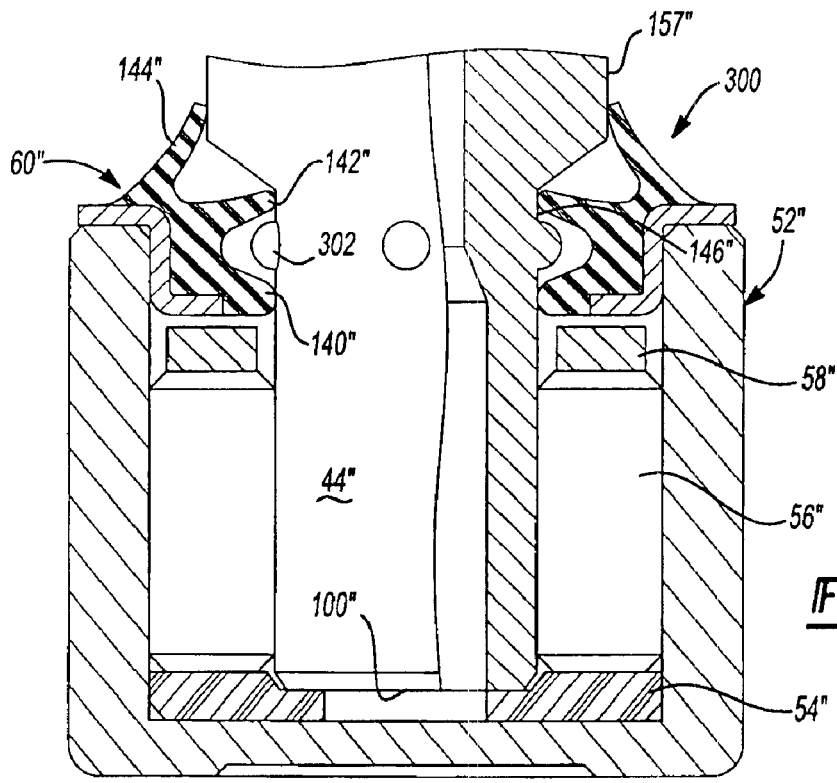
FIG. 6 is a cross-sectional side view of another alternate embodiment trunnion and seal constructed in accordance with the teachings of the present invention.

FIG. 6 depicts another alternate retention mechanism 300. Retention mechanism 300 includes an alternate trunnion 44" having a projection 302 radially extending therefrom. Projection 302 may be in the form of an annular ring or a plurality of nubs as previously described. Retention mechanism 300 includes an alternate seal 60" configured to accept projection 302 between first lip 140" and second lip 142". In this embodiment, only second lip 142" and third lip 144" are positioned inboard of projection 302. First lip 140" is positioned between projection 302 and the distal end of trunnion 44". Second lip 142" engages seal race portion 146" and is positioned on trunnion 44". Seal race portion 146" defines an annular surface recessed inwardly of projection 302 to assure that second lip 142" interferes with projection 302 when a removal force is applied to bearing cup 52".

Once bearing cup assemblies 48 and 50 are installed on trunnions 44 and 46, the bearing cup assemblies are inserted into leg apertures 28 and 38. Thereafter, cruciform 20 is centered, dynamically balanced and coupled to legs 22 and 32. A variety of methods for securing yokes 16 and 18 to cruciform 20 are available. One method includes mounting a snap ring 162 within a circumferential groove 164 formed on outer wall surface 66 of bearing cup 52. Snap ring 162 engages inboard surface 24 to retain the bearing assembly. Alternatively, portions of outboard surface 26 surrounding apertures 28 may be deformed using processes such as staking or peening to create local areas which engage outer end surface 70 of bearing cup 52. Another method involves injecting molten resin within a passageway extending between the leg and the bearing cup. The molten resin solidifies to retain the bearing cup within the aperture of the leg. Yet another retention method incorporates the use of projections (not shown) extending from legs 22 which may be deformed to engage a snap ring against outer end surface 70 of bearing cup 52. One or more of these methods is disclosed in commonly-owned U.S. Pat. Nos. 6,280,335, 6,162,126 and 6,336,868, the entire disclosure of each being hereby incorporated by reference.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A universal joint comprising:
   a yoke including a leg having an aperture extending therethrough;
   a cruciform having a trunnion;
   a bearing cup mounted on said trunnion, said bearing cup having a tubular segment positioned in said aperture, said trunnion including a radially extending projection; and
   a seal having a case and an elastomer coupled to said case, said case engaging said tubular segment of said bearing cup, said elastomer including a plurality of annular lips engaging said trunnion, wherein said projection is axially positioned between said plurality of lips and a distal end of said trunnion to retain said bearing cup to said trunnion.

2. The universal joint of claim 1 wherein said plurality of annular lips includes a first lip, a second lip and a third lip, said first lip being positioned closest to the distal end of said trunnion, said first lip extending radially inwardly and engaging a seal race portion of said trunnion, said projection extending radially outwardly beyond said seal race portion.

3. The universal joint of claim 2 wherein said second lip is spaced apart from said first lip and shaped as a wiper being cantilevered from a body portion of said elastomer.

4. The universal joint of claim 3 wherein said third lip is axially spaced apart from said second lip and shaped as a wiper being cantilevered from said body portion of said elastomer.

5. The universal joint of claim 1 wherein said tubular segment includes an end face at an open end of said bearing cup, wherein said projection is axially positioned between said end face and a distal end of said trunnion.

6. The universal joint of claim 1 wherein said case includes a wall engaging a surface of said bearing cup.

7. The universal joint of claim 1 further including a seal washer positioned between said seal and a bearing engaging said trunnion, said seal washer positioned adjacent said projection.

8. The universal joint of claim 1 further including a thrust washer positioned between an end surface of said trunnion and said bearing cup.

9. The universal joint of claim 1 wherein said case includes a circumferential wall engaging an inner circumferential surface of said tubular segment.

10. The universal joint of claim 1 wherein said case includes a radially extending flange engaging an end surface of said tubular segment of said bearing cup.

11. A universal joint comprising:
    a cruciform having a trunnion, said trunnion including a substantially cylindrical bearing surface and a projection radially extending from said bearing surface;
    a bearing cup rotatably mounted on said trunnion, said bearing cup including a tubular segment and an end segment;
    a bearing engaging said bearing cup and said bearing surface, said bearing being axially positioned between said projection and said end segment of said bearing cup; and
    a seal having a substantially rigid case and an elastomeric body coupled to said case, said case being mounted to said bearing cup, said elastomeric body including a plurality of axially spaced apart lips engaging said cruciform, wherein at least one of said lips engages said bearing surface to retain said bearing cup on said trunnion.

12. The universal joint of claim 11 wherein said case includes a cylindrical segment engaging an inner substantially cylindrical wall of said bearing up.

13. The universal joint of claim 12 wherein said case includes a radially extending flange engaging an end face of said tubular segment.

14. The universal joint of claim 13 wherein said projection is axially positioned between said end face of said tubular segment and a distal end of said trunnion.

15. The universal joint of claim 14, wherein one of said lips is axially positioned between said end face of said tubular segment and said projection.

16. The universal joint of claim 15 further including a thrust washer positioned between said end segment of said bearing cup and an end surface of said trunnion.

17. The universal joint of claim 11, wherein said projection is shaped as a substantially continuous ring circumscribing said substantially cylindrical bearing surface.

18. A universal joint comprising:
- a yoke including a leg having an aperture extending therethrough;
- a cruciform having a trunnion;
- a bearing cup mounted on said trunnion, said bearing cup having a tubular segment positioned in said aperture, said trunnion including a radially extending projection; and
- a seal having a case and an elastomer coupled to said case, said case engaging said tubular segment of said bearing cup, said elastomer including a plurality of annular lips engaging said trunnion, said projection being axially positioned between one of said lips and a distal end of said trunnion to retain said bearing cup to said trunnion, said tubular segment including an end face at an open end of said bearing cup, said projection being axially positioned between said end face and a distal end of said trunnion.

* * * * *